UNITED STATES PATENT OFFICE.

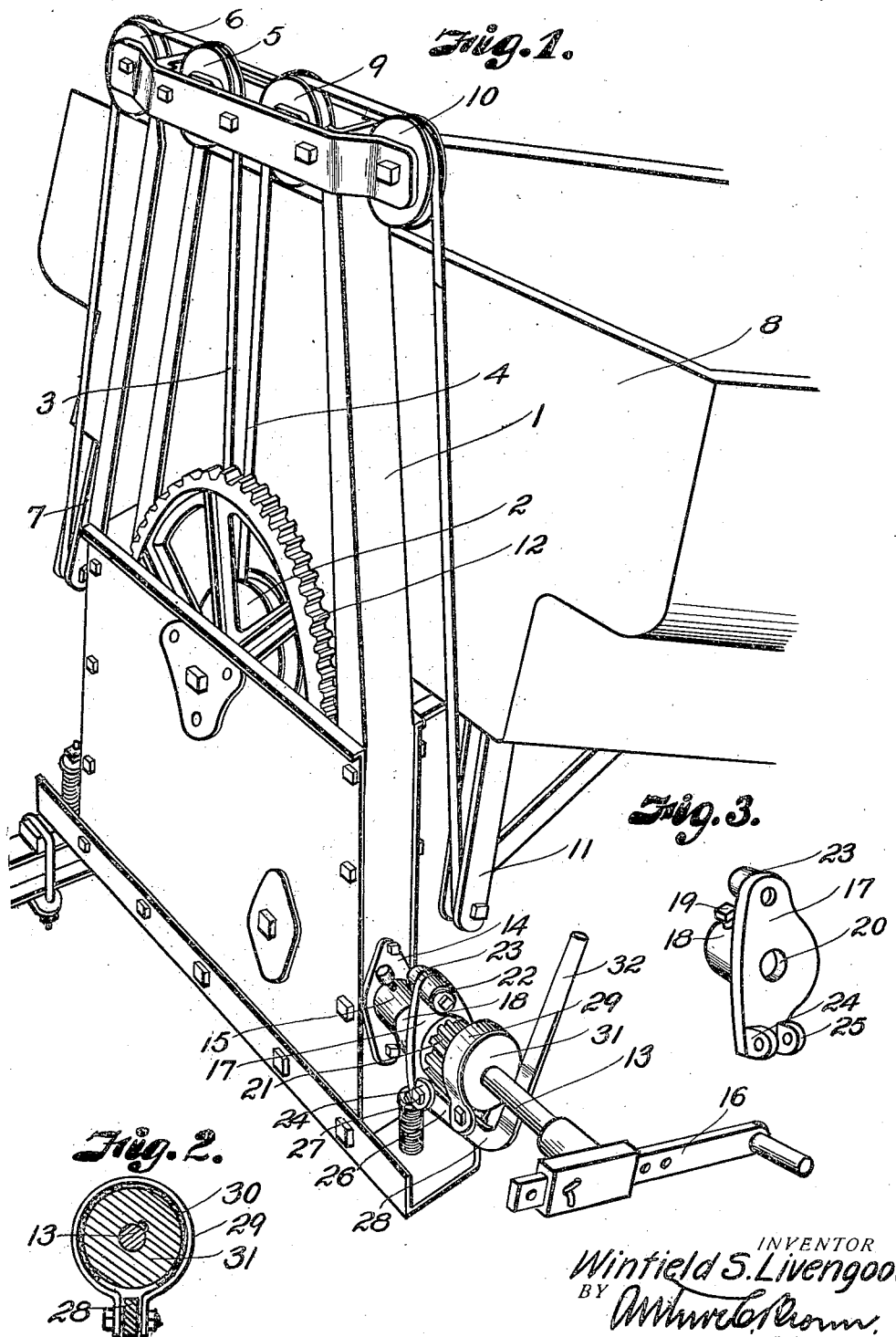

WINFIELD S. LIVENGOOD, OF KANSAS CITY, MISSOURI, ASSIGNOR TO ANDREW A. KRAMER, OF KANSAS CITY, MISSOURI.

BRAKE FOR HOISTS.

1,425,600.   Specification of Letters Patent.   Patented Aug. 15, 1922.

Application filed December 13, 1920. Serial No. 430,565.

*To all whom it may concern:*

Be it known that I, WINFIELD S. LIVENGOOD, a citizen of the United States, residing at Kansas City, in the county of Jackson and State of Missouri, have invented certain new and useful Improvements in Brakes for Hoists; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hoisting apparatus, particularly applicable in connection with dumping truck bodies of the type illustrated in a patent granted to me August 5, 1919, No. 1,312,489, and assigned to A. A. Kramer.

The present invention contemplates a friction brake and means for attaching it to a hoisting mechanism so that the unwinding movement of the cables may be retarded when the truck body tends to move to normal position, the brake being also capable of holding the truck body in any elevated position that the occasion may demand.

The particular construction of the hoisting mechanism is unimportant in so far as the present invention is concerned, the novel features residing in the brake rather than in the details of construction of the hoisting mechanism.

In the drawings,

Fig. 1 is a perspective view of the front end of a hoisting truck of preferred construction to which my invention is applied.

Fig. 2 is a cross sectional view through the brake drum and power shaft, the brake band being shown in elevation, and Fig. 3 is a detail perspective view of the brake-mechanism supporting bracket.

1 designates a hoisting frame in which is mounted a winding drum 2, for the cables 3 and 4. The cable 3 passes over pulleys 5 and 6 attached to the bracket arm 7 on the dump body 8, while the cable 4 passes over the pulleys 9 and 10 and is fastened at its end to the bracket arm 11 on the dump body 8. Therefore, if the drum is turned in one direction, the dump body will be raised and if the drum is turned in an opposite direction, the dump body will be lowered.

Rigid with the drum 2 is a gear 12, which receives motion from a pinion gear, not shown, on the power shaft 13. The power shaft projects through a bearing 14, having a tubular portion 15, which constitutes a bar for shaft 13 so that the shaft will be suitably supported when it is rotated from the power source as, for example, the crank 16.

There is a brake-mechanism supporting bracket sleeved on the shaft and supported upon the barrel-shaped projection or tubular portion 15, carried by the plate 14. The bracket is best shown in detail in Fig. 3 as consisting of a plate 17 having a tubular sleeved portion 18 adapted to fit over the tubular portion 15 and be secured thereto by a fastening device as, for example, a set screw 19.

The shaft 13 projects through the tubular portion 18 and through the opening 20 in the plate 17, and it carries a ratchet wheel 21 rigid therewith to be engaged by a pivoted dog or pawl 22, pivoted to the upper portion or bearing 23 on the plate 17. The lower end of the plate 17 is provided with two outstanding ears or lugs 24 and 25 between which is pivoted an elbow brake lever 26 connected to the lugs or ears 24 and 25 by a pivot bolt 27.

The lateral arm 28 of the brake lever carries a brake band or strap 29, which may be fastened with a suitable braking material 30 and which surrounds a brake drum 31 rigid on the shaft 13 so that when the handle arm 32 of the brake lever is pulled in one direction, the band will be caused to bind about the drum 31 to prevent rotative movement of the shaft 13 and consequently, rotative movement of any of the working parts of the hoist.

When the parts are assembled and the crank or other power device is operated to turn the power shaft 13, lost motion will be communicated to the gear 12 and drum 2, winding the cables 3 and 4 so as to raise the dump body 8. When it is desired to lower the dump body or to hold it in any raised position, the operator need only pull from left to right on the handle 32, which will cause the brake band to bind tightly on the drum 31 to hold the shaft 13 and, consequently, retard any rotative movement of the winding mechanism.

It will be apparent that the handle 32 is in juxtaposition to the crank 16 so that the operator may wind the shaft 13 with the right hand while controlling the brake lever handle 32 with the left, thus giving perfect control of the hoisting mechanism.

The brake mechanism has been shown as associated with a particular kind of hoisting mechanism although it is obvious that the exact details of construction of the hoisting mechanism is not so important.

What I claim and desire to secure by Letters-Patent is:

1. The combination with a hoisting frame, a power shaft and its bearings having a projecting tubular portion, of a bracket plate sleeved on the shaft and provided with a tubular portion telescoped with the tubular portion of the bearing, a lever pivoted to said plate, a brake band connected to the lever, and a brake drum on the shaft engageable by the band.

2. The combination with the frame of a hoist having a power shaft bearing and the power shaft which projects through it, of a bracket plate fastened to the bearing, a lever pivoted to the bracket plate, a brake band connected to the lever, and a brake drum on the power shaft to be engaged by the band.

3. The combination with the frame of a cable drum-actuated hoist, of a power shaft for actuating the drum mechanism, a bearing on the frame through which the power shaft projects, a ratchet on the shaft, a brake drum on the shaft, a bracket connected to the bearing, a pivoted pawl carried by the bracket and engageable with the ratchet, a brake lever pivoted to the bracket, and a brake band carried by the lever for engagement with the brake drum.

In testimony whereof I affix my signature.

WINFIELD S. LIVENGOOD.